United States Patent [19]

Kaube et al.

[11] Patent Number: 4,513,048
[45] Date of Patent: Apr. 23, 1985

[54] WEBBED MULTIPLE SHEETS

[75] Inventors: Peter Kaube, Rossdorf; Karl-Heinz Schanz, Muehltal; Heinz Vetter, Rossdorf; Jens Müller, Griesheim, all of Fed. Rep. of Germany

[73] Assignee: Rohm GmbH Chemische Fabrik, Darmstadt, Fed. Rep. of Germany

[21] Appl. No.: 528,133

[22] Filed: Aug. 31, 1983

[30] Foreign Application Priority Data

Sep. 9, 1982 [DE] Fed. Rep. of Germany ... 8225408[U]

[51] Int. Cl.$^3$ .................. B32B 3/26; B32B 27/08
[52] U.S. Cl. .................. 428/188; 156/244.11; 264/177 R; 428/167; 428/212; 428/332; 428/412; 428/422; 428/500; 428/483
[58] Field of Search .............. 428/188, 212, 178, 167, 428/332, 412, 421, 422, 485; 156/244.11; 264/177 R

[56] References Cited

U.S. PATENT DOCUMENTS 3,707,009 12/1972 Wegner .................. 428/188
3,748,214 7/1973 Withers .................. 428/188

Primary Examiner—Paul J. Thibodeau
Attorney, Agent, or Firm—Oblon, Fisher, Spivak, McClelland & Maier

[57] ABSTRACT

Webbed multiple sheets comprising two substantially parallel, substantially plane polymethylmethacrylate outer layers and at least one center layer between said outer layers, wherein said outer layers and said center layer are bonded together into one piece by webs and wherein said center layer or layers comprise a thermoplastic material having increased tenacity, increased zero viscosity or a combination thereof in molten condition as compared with the material of said outer layers, thereby reducing sagging of said center layer or layers during extrusion.

6 Claims, 4 Drawing Figures

WEBBED MULTIPLE SHEETS

BACKGROUND OF THE INVENTION

1. Field of the Invention

This invention relates to a webbed multiple sheet having at least one center layer arranged between two parallel, substantially plane polymethylmethacrylate (PMMA) outer layers, wherein the outer and center layers are bonded into one piece by webs.

2. Description of the Prior Art

Webbed multiple sheets which exhibit at least one center layer arranged between two parallel, substantially plane PMMA outer layers and which are bonded into one piece by webs are known and are commercially available. They are produced by extrusion with simultaneous formation of the outer and center layers and of the webs.

After the hollow extruded material leaves the extrusion die, the outer layers are cooled below the softening temperature while passing through a vacuum forming channel. The center layers and the webs remain thermoplastic longer than the outer layers. Since they are not supported, the center layers tend to sag between the webs in case of horizontal extrusion. This effect can be reduced if the center layers are made very thin because in that case, less heat must be performed in order to get below the softening temperature and if, in addition, the extruding is performed very slowly. Hence, it is desirable to maintain a minimum thickness for the center layers. However, even very thin center layers are still damaged to some degree.

Therefore, a need continues to exist for a webbed multiple sheet having a center layer with a reduced tendency to sag or break.

SUMMARY OF THE INVENTION

Accordingly, it is an object of the present invention to provide a webbed multiple sheet having a center layer with a reduced tendency to sag or break.

It is also an object of this invention to provide a webbed multiple sheet having a center layer with a reduced tendency to sag or break, even when the center layer is very thin.

Moreover, it is an object of the present invention to provide a process for producing a webbed multiple sheet having a center layer with a reduced tendency to sag or break, wherein the webbed multiple sheet is extruded at a considerably faster rate than webbed triple sheets, which consist of PMMA alone.

Further, it is an object of this invention to provide a webbed multiple sheet which can be produced rapidly and economically in marketable sizes.

According to the present invention, the foregoing and other objects are attained by providing a webbed multiple sheet which comprises two substantially parallel, substantially plane polymethylmethacrylate outer layers and at least one center layer between said outer layers, wherein said outer layers and said center layer are bonded together into one piece by webs and wherein said center layer or layers comprise a thermoplastic material having increased tenacity, increased zero viscosity or a combination thereof in molten condition as compared with the material of said outer layers, thereby reducing sagging of the center layer or layers during extrusion.

BRIEF DESCRIPTION OF THE DRAWINGS

Other objects, features and attendant advantages of the present invention will be more fully appreciated as the same becomes better understood from the following detailed description when considered in connection with the accompanying drawings in which like reference characters designate like or corresponding parts throughout the several views and wherein.

DETAILED DESCRIPTION OF THE PREFERRED EMBODIMENTS

According to the present invention, it is now possible to reduce the tendency of the center layers of webbed multiple sheets to sag or break by using a webbed multiple sheet having a center layer or layers which are made of a thermoplastic material having an increased zero viscosity, increased tenacity or a combination thereof in molten condition as compared with the material of the outer layers.

Figure 1:
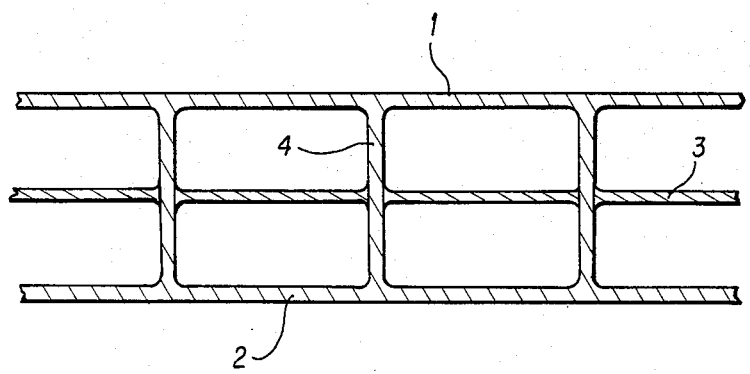
FIG. 1 illustrates an embodiment of the present invention, wherein the outer layers have one or more center layers therebetween, wherein the outer layers and center layer or layers are bonded together with webs.
Figure 2:
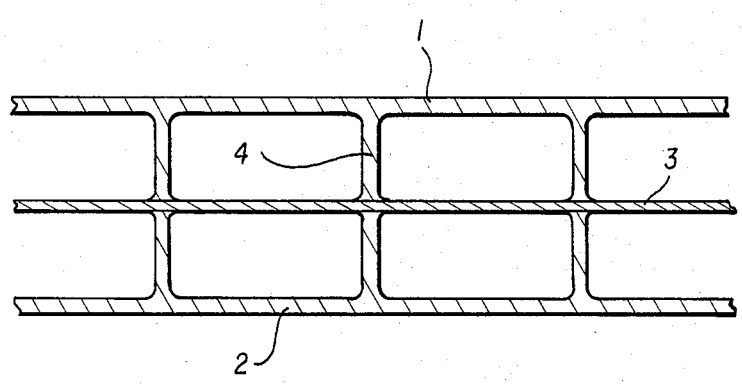
FIG. 2 illustrates a similar embodiment.
Figure 4:
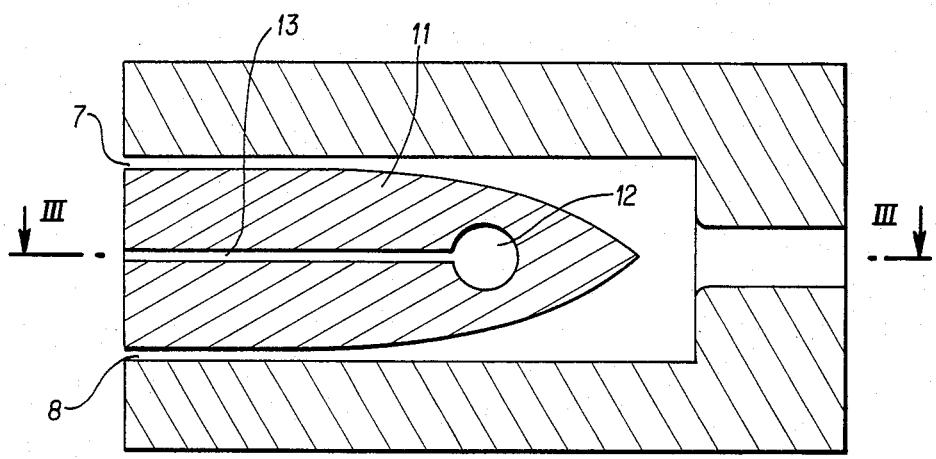
FIG. 4 illustrates a section through an extrusion device for the production of the present webbed multiple sheets.
Figure 3:
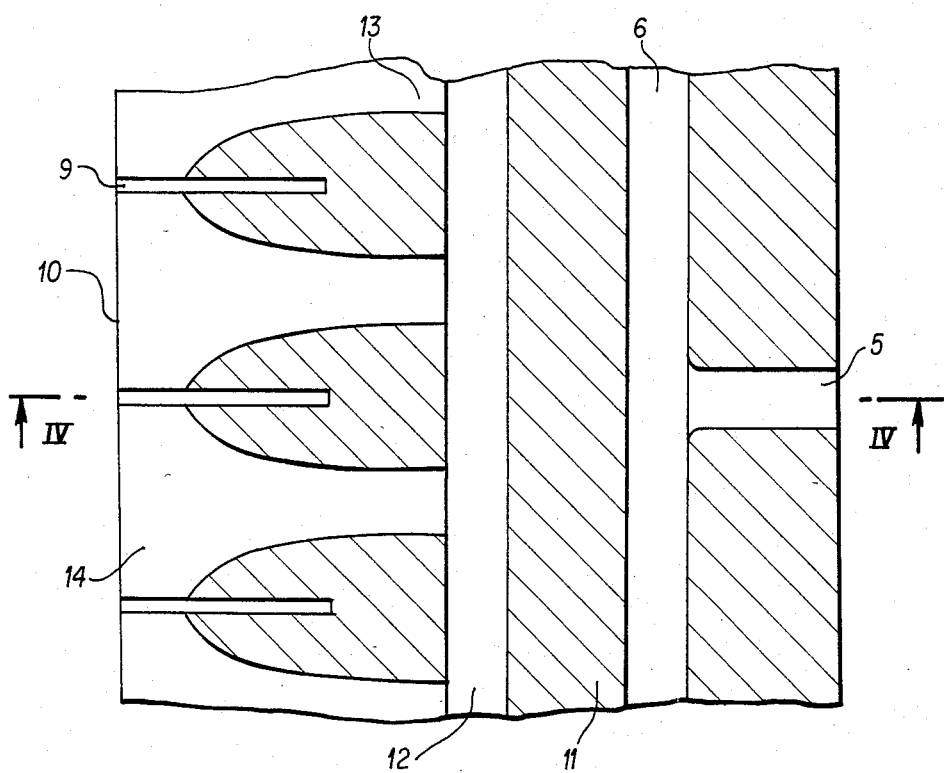
FIG. 3 illustrates a section through an extrusion device for the production of the present webbed multiple sheets.

Suitable embodiments of the present invention are shown in FIGS. 1 and 2 in cross sections. FIGS. 3 and 4 show sections through an extrusion device for the production of webbed multiple sheets according to the invention.

At least the outer layers, 1 and 2, consist of polymethylacrylate (PMMA). By this is meant an extrudable molding material with a base of PMMA or of copolymers of at least 88% by weight of methylmethacrylate and a maximum of 12% by weight of comonomers, such as other methacrylic esters, acrylic esters, acrylonitrile, styrene or the like. The dimensional stability under heat according to DIN 53463, Process B, of the molding material must not be below 75° C. The molding material may contain coloring, darkening, impact-resistant or other customary additives. As a rule, the webs, 4, consist wholly or predominantly of the same material as the outer layers, 1 and 2. Preferably they are arranged perpendicular to the outer layers; however, a diagonal or curved cross section is possible.

The webbed multiple sheets can have one or more center layers, 3. The center layers may be corrugated, zigzagged or stepped, but they are preferably arranged flat and parallel to the outer layers. The following embodiments that relate to a webbed triple sheet with one center layer, 3, analogously also apply to sheets with two or more center layers.

By formation of the center layer from a plastic with increased tenacity as compared with the material of the outer layers, the risk of breaking of the center layer is also reduced, even though the latter is very thin. For example, its thickness can be 0.03–0.5 mm. For the center layer, thermoplastically extrudable materials with an impact resistance according to DIN 53453 of at least 10, preferably 50 KJ/m$^2$ or more, are suitable.

Plastics with an increased zero viscosity in the molten state as compared with the material of the outer layers cause the center layer to have adequate dimensional stability at a higher temperature or earlier during cooling. As a result, the danger of sagging is also reduced for the greater thicknesses of the center layer. The development of a sag of the center chords is a slow flow process in which the structural viscosity of the plastic melt is practically not noticeable. The depth of the developing sag depends on the elastic viscosity $\eta_{D,O}$ at zero creep rate. In this area, there applies the relation between elastic viscosity ($\eta_{D,O}$ and shear viscosity $\eta_{S,O}$ found for Newtonian liquids by F. T. Trouton (Proc. Roy. Soc. A77, 326 [1906] 92)):

$$\eta_{D,O} = 3\eta_{S,O}$$

whereby the Index 0 indicates the zero shear or elongation rate. The shear viscosity $\eta_S$ can be measured for example by means of a capillary viscosimeter at varying shear rates; cf. G. Schreyer, Konstruieren mit Kunststoff (Constructing with Plastics), Vol. 2 (Carl Hauser Verlag). The extrapolation on the zero shear rate results in the value $\eta_{S,O}$ from which the zero viscosity $\eta_{D,O}$, which is decisive for the invention, can be calculated from the above equation.

Thermoplastic materials with differing zero viscosity are commercially available. A high zero viscosity can be caused by certain structural characteristics of the polymer molecules of the plastic material or by an increases softening temperature compared with the material of the outer layer.

It is especially preferable if the zero viscosity or the tenacity of the center layer material are simultaneously higher than the corresponding values of the PMMA material of the outer layers. These characteristics are achieved by plastics of the group of polycarbonates, polysulfones and thermoplastic polyesters. They also have sufficient compatibility with PMMA which guarantees the bond of the various materials in a single piece. Polycarbonate plastics, and of them especially bisphenol A polycarbonate, have proven to be particularly suitable. It has a Vicat softening temperature according to DIN 53460 (Process B) of 145° C. and the impact resistance according to DIN 53453 is greater than 70 kg/m$^2$, i.e., the standard small rods do not break during the impact test. Other suitable polycarbonate plastics are derived from other aromatic bisphenols, such as methylenebisphenol or dihydroxydiphenyl ether. Fluoropolymers are also suitable, such as polyvinylidene fluoride, polychlorotrifluoroethylene or copolymers of tetrafluoroethylene and hexafluoropropylene.

The new webbed multiple sheets are produced by joint extrusion of all layers and webs. The extrusion tool suitably has the design shown in FIGS. 3 and 4. Molten PMMA is pressed through mass channel 5 into distribution channel 6 from an extruder (not shown) and flows from there into channels 7 and 8 forming the outer layers 1 and 2 and into slot 9 between the core parts 10, whereby the webs 4 are formed. The core parts 10 are arranged on a beam 11 in which a distribution channel 12 runs. Molten plastic to form the center layer 3 is fed into distribution channel 12 from a second extruder and pressed into each individual core part 10 through channels 13. Channels 13 widen like a fan 14 in the direction of the nozzle end and there cover the full width of core parts 10, so that the molding material streams that pass through unite with those in slots 9. With relatively little molding material pressure in channels 13, a cross section corresponding to FIG. 1 is formed through which the material passes into the webs. With higher pressure in channels 13, the molding material emerging from there flows together with the molding material from the adjoining core parts and hollow extruded material according to FIG. 2 is formed. If the pressure in channels 13 continues to increase, it is possible for webs 4 to be formed partly or completely from the plastic of the center layer 3. The hollow extruded material receives its final cross section shape in the vacuum forming channel that is arranged behind the extrusion die.

While webbed triple sheets, which consist of PMMA alone, can be extruded only at slow speeds, the webbed multiple sheets according to the invention can be extruded at a considerably faster rate without significant sag of the center chord.

Webbed multiple sheets according to the invention in the marketable sizes can be produced quickly and economically. For example, their width is between 500 and 2000 mm, their total thickness is between 8 and 50 mm and the thickness of the webs and outer layers is between 0.5 and 2.5 mm. An essentially right angle cross section geometry is preferred like that in FIGS. 1 and 2, whereby the adjoining webs 4 and the parts of the outer layers 1, 2 enclosed between them for a virtual square.

The webbed multiple sheets are widely used as good, thermal insulating window material for residential and industrial structures, greenhouses, indoor swimming pools, etc.

Having now fully described the present invention, it will be apparent to one of ordinary skill in the art that many changes and modifications can be made thereto without departing from the spirit or scope of the invention as set forth herein.

What is claimed as new and desired to be secured by letters patent of the United States is:

1. Webbed multiple sheets comprising two substantially parallel, substantially plane polymethylmethacrylate outer layers and at least one center layer between said outer layers, wherein said outer layers and said center layers are bonded together into one piece by webs and wherein said said center layer or layers comprise a thermoplastic material having increased tenacity, increased zero viscosity or a combination thereof in molten condition, as compared with the material of said outer layers, thereby reducing sagging of said center layer or layers during extrusion, and wherein said thermoplastic material of said center layer or layers is selected from the group consisting of polycarbonates, polysulfones, thermoplastic polyesters and fluoropolymers.

2. The webbed multiple sheets of claim 1, wherein the thermoplastic material of said center layer or layers is polycarbonate.

3. The webbed multiple sheets of claim 2, wherein the thermoplastic material of said center layer or layers is bisphenol A polycarbonate.

4. The webbed multiple sheets of claim 2, wherein the thermoplastic material of said center layer or layers is methylenebisphenol polycarbonate or dihydroxydiphenyl ether polycarbonate.

5. The webbed multiple sheets of claim 1, wherein said fluoropolymers comprise polyvinylidene fluoride, polychlorotrifluoroethylene or copolymers of tetrafluoroethylene and hexafluoropropylene.

6. The webbed multiple sheets of claim 1, wherein the thickness of said center layer or layers is in the range of 0.03 to 0.5 mm.

* * * * *